(12) United States Patent
Knie et al.

(10) Patent No.: US 7,900,734 B2
(45) Date of Patent: Mar. 8, 2011

(54) RIDER LIFT TRUCK

(75) Inventors: Andreas Knie, Hamburg (DE);
Ernst-Peter Magens, Ammersbek (DE);
Frank Maenken, Henstedt-Ulzburg (DE); Christoph Weber,
Henstedt-Ulzburg (DE)

(73) Assignee: Jungheinrich Aktiengesellschaft,
Hamburg (DE)

( * ) Notice: Subject to any disclaimer, the term of this patent is extended or adjusted under 35 U.S.C. 154(b) by 217 days.

(21) Appl. No.: 12/208,591

(22) Filed: Sep. 11, 2008

(65) Prior Publication Data

US 2009/0067969 A1   Mar. 12, 2009

(30) Foreign Application Priority Data

Sep. 11, 2007   (DE) .................. 10 2007 043 280

(51) Int. Cl.
*B62D 51/04* (2006.01)
(52) U.S. Cl. ................ 180/252; 180/12; 180/13
(58) Field of Classification Search .............. 180/252, 180/12, 13
See application file for complete search history.

(56) References Cited

U.S. PATENT DOCUMENTS

| | | | | |
|---|---|---|---|---|
| 2,875,852 A * | 3/1959 | Morrell | ............ | 187/229 |
| 3,016,973 A * | 1/1962 | Williamson | ............ | 182/14 |
| 3,181,640 A * | 5/1965 | Goodacre et al. | ............ | 180/19.2 |
| 4,615,533 A * | 10/1986 | Sewell | ............ | 280/43.12 |
| 5,265,021 A * | 11/1993 | Avitan | ............ | 701/41 |
| 5,325,935 A * | 7/1994 | Hirooka et al. | ............ | 180/211 |
| 6,883,625 B2 * | 4/2005 | Trego et al. | ............ | 180/19.2 |
| 6,901,323 B2 * | 5/2005 | Kokura | ............ | 701/50 |
| 6,940,415 B2 * | 9/2005 | Nagata et al. | ............ | 340/657 |
| 7,017,689 B2 * | 3/2006 | Gilliland et al. | ............ | 180/19.1 |
| 7,019,624 B2 * | 3/2006 | Kawashima et al. | ............ | 340/425.5 |
| 7,661,493 B2 * | 2/2010 | Rose | ............ | 180/19.3 |
| 2003/0029647 A1 * | 2/2003 | Trego et al. | ............ | 180/19.1 |
| 2003/0029648 A1 * | 2/2003 | Trego et al. | ............ | 180/19.1 |
| 2005/0247508 A1 * | 11/2005 | Gilliland et al. | ............ | 180/402 |
| 2006/0231301 A1 * | 10/2006 | Rose et al. | ............ | 180/19.1 |
| 2006/0231302 A1 * | 10/2006 | Rose | ............ | 180/19.3 |
| 2007/0080000 A1 * | 4/2007 | Tobey et al. | ............ | 180/21 |
| 2007/0137904 A1 * | 6/2007 | Rose et al. | ............ | 180/19.1 |
| 2009/0012677 A1 * | 1/2009 | Passeri et al. | ............ | 701/41 |
| 2009/0194357 A1 * | 8/2009 | Wetterer et al. | ............ | 180/402 |
| 2009/0194358 A1 * | 8/2009 | Corbett et al. | ............ | 180/402 |

FOREIGN PATENT DOCUMENTS

| | | |
|---|---|---|
| DE | 19756473 C1 | 6/1999 |
| DE | 10258295 A1 | 7/2004 |
| DE | 10311344 A1 | 9/2004 |
| DE | 60117956 T2 | 11/2006 |
| WO | 2006/108531 A3 | 10/2006 |

* cited by examiner

*Primary Examiner* — Lesley Morris
*Assistant Examiner* — Michael R Stabley
(74) *Attorney, Agent, or Firm* — Vidas, Arrett & Steinkraus

(57) ABSTRACT

A rider lift truck with a drive portion, in which is arranged a travelling drive featuring at least one electric travelling motor for at least one steered driving wheel, with a steering device for the driving wheel, a load portion featuring a mast, an electric control unit for the travelling drive and operational controls for the travelling drive and the steering device and with a standing platform, wherein a horizontally arranged travelling motor is provided below the flatly built standing platform as a wheel hub drive for the driving wheel, and a steering motor is arranged below the standing platform alongside to the travelling motor, which is coupled with a fifth wheel for the driving wheel via a steering gear.

10 Claims, 1 Drawing Sheet

RIDER LIFT TRUCK

CROSS-REFERENCE TO RELATED APPLICATIONS

Not applicable

STATEMENT REGARDING FEDERALLY SPONSORED RESEARCH

Not applicable

BACKGROUND OF THE INVENTION

In a floor conveyor, its manoeuvrability is a decisive feature. The same is essentially determined by the so-called L2-dimension, the distance between the vehicle front side and the fork back. Most lift trucks are so-called walkie vehicles, in which an operation and steering takes place via a pivotal drawbar. However, it is known from DE 601 17 956 D2, the entire contents of which is incorporated herein by reference, to fold out a platform on the drive portion of the floor conveyor. When using such a foldable platform, the L2-dimension is significantly enlarged.

From DE 197 56 473 C1, the entire contents of which is incorporated herein by reference, it has become known to arrange the drawbar of a lift truck out of centre, and to arrange a fixedly integrated standing platform on the frame of the drive portion inside its outer contours on the side facing the drawbar, such that the driver standing transversely can actuate the drawbar with one hand. From DE 103 11 344 A1, the entire contents of which is incorporated herein by reference, it is known to execute the upper side of the drive portion for a rider lift truck as a standing platform.

From DE 102 58 295, the entire contents of which is incorporated herein by reference, a lift truck with driver seat has become known in which the driver seat is arranged above the drives.

It is common to the mentioned forms of realisation that the standing platforms or the driver seat have a high entrance height. This can be explained amongst others by the fact that the battery compartment is used also as a standing or seating surface.

The present invention is based on the objective to provide a floor conveyor for the rider operation, which has a very small L2-dimension and a very low entrance height.

BRIEF SUMMARY OF THE INVENTION

In the rider lift truck according to the present invention, a fork lift truck in particular, the standing platform is arranged above the drive portion, and the travelling drive is built flatly. The travelling drive has a succumbentyl arranged travelling motor as a wheel hub drive for the driving wheel, a direct drive for instance.

In the present invention, the arrangement of the travelling drive as well as its compact execution permit a small height of the housing space of the drive portion accommodating the drive, so that the stepping height for the standing platform can be kept very small. Typically, the entrance height is 250 mm or less. As the standing platform is arranged above the drive portion, and the same is not enlarged in its length with respect to conventional drive portions, a very small L2-dimension is obtained also.

Below the standing platform, a steering motor is arranged alongside to the travelling motor, which is coupled to a fifth wheel for the driving wheel via a steering gear. As the steering motor can de dimensioned relatively smaller, it can be arranged upstanding in the drive portion without problems. For instance, a belt- or chain gear serves as a steering gear, wherein the fifth wheel has a corresponding belt- or chain wheel in a concentric arrangement.

In one embodiment of the present invention, it is provided that in the direct drive, the electric motor axially penetrates the hub of the driving wheel, and the outside lying rotor of the electric motor is splinedly connected to the wheel hub. When using a wheel hub drive, the electric motor sits preferably on one side only of the hub.

According to a further embodiment of the present invention, the lift truck of the present invention has two driving wheels, each at a time being provided with a travelling motor. Such a drive arrangement comes in consideration then, when the desired travel performance cannot be obtained with only one motor. Preferably, in such a case one steering motor is associated to each driving wheel also.

In low lift trucks, an upright standing mast is usually connected to the drive portion, which serves for guiding a load frame. In conventional rider lift trucks, a drawbar is mounted in this assembly part on its topside. According to the present invention, the standing platform extends up to the mast or up to the case of the mast, respectively. According to a further embodiment of the invention, the topside of the standing platform is planar throughout its extent.

In contrast to drawbar guided lift trucks, a further embodiment of the invention provides that parallel spaced and approximately horizontally extending supporting arms are provided on both sides of the mast or its case, respectively, on the side facing the standing platform, from which at least one features operational controls for the lift truck. The operator standing on the standing platform keeps hold on at least one supporting arm, wherein he/she can actuate an operational control for the lift truck at the same time, with the same hand or another hand.

According to a further embodiment of the present invention, an electric steering transmitter is also mounted on a supporting arm. The steering transmitter can be executed such that at least one further operational control is mounted on the steering transmitter, a travelling switch for instance.

BRIEF DESCRIPTION OF THE VIEWS OF THE DRAWINGS

One embodiment of the present invention is explained in more detail by means of drawings in the following.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
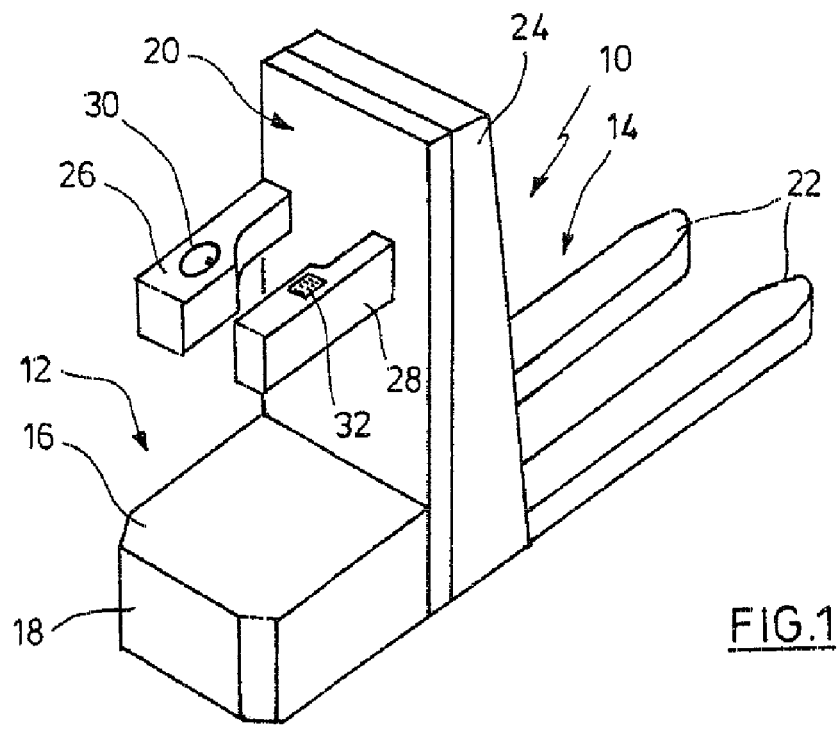
FIG. 1 shows a rider lift truck according to the present invention in a very schematic perspective representation.

In FIG. 1, a rider lift truck 10 is depicted, which has a drive portion 12 and a load portion 14. The drive portion 12 has a standing platform 16, to which a lateral case 18 is appended towards the downside. Standing platform 16 and case 18 comprise an accommodation space for a travelling drive and a steering drive, as will be described in the following. The height of the standing platform 16 above the floor is small, 250 mm at maximum.

At the end facing the load portion 14, the drive portion has an upright assembly part 20, which serves as a case for a not shown mast, which guides a not shown load frame, to which fork arms 22 are fixedly connected. With the aid of a not shown lifting device, the load frame and with it the fork can be lifted for a certain amount, for instance in order to lift a palette from the ground. In this, load rollers (not shown) mounted in the load forks 22 in a known manner are automatically folded towards the downside. Within a box-shaped case 24 there is a battery for the supply of the electric drive units, which is lifted together with the load frame. Above the standing platform 16, two parallel spaced supporting arms 26, 28 are mounted on the case or the mast, which extend approximately horizontally and which have the purpose to permit a support for the driver. The distance of the supporting arms 26, 28 may be such that the driver can stay between the same. Of course, it is also possible to make the supporting arms 26, 28 shorter than is depicted in FIG. 1.

On the upper side of the supporting arm 26, there is provided a steering transmitter 30 for an electric steering of the floor conveyor 10. At 32, there is an operational control at the upper side of the supporting arm 28, for instance for lifting and lowering the load portion 14. A travel control element can be integrated into the steering transmitter 30, which is not shown here, however.

Figure 2:
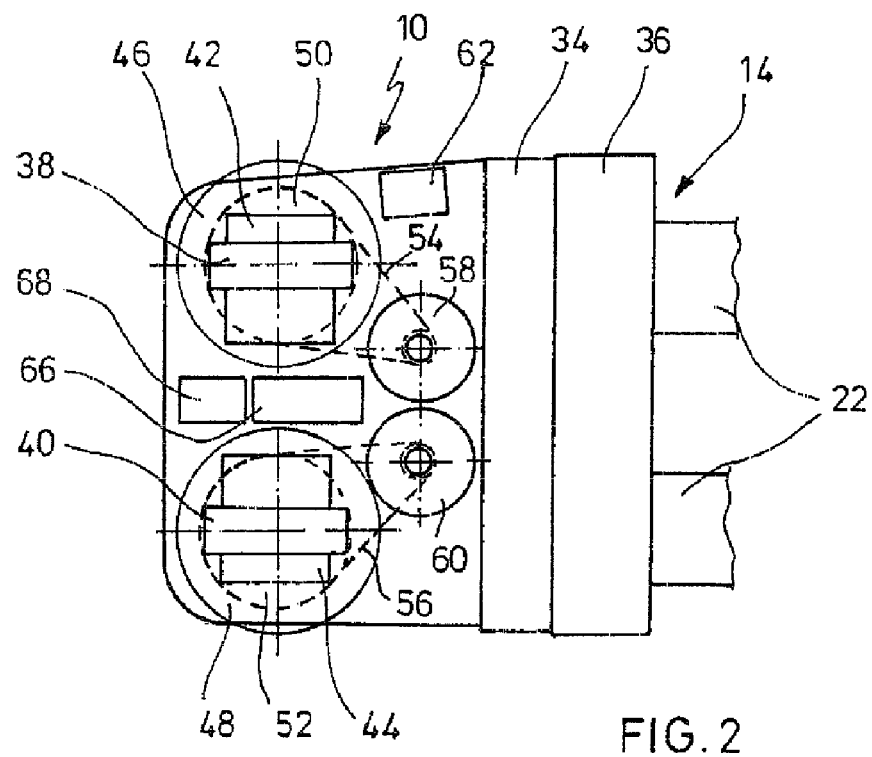
FIG. 2 shows a top view on the lift truck after FIG. 1 with the standing platform being removed.

In FIG. 2, the mast for the load frame is indicated at 34, as well as a battery 36, which is arranged on the side of the mast 34 facing the fork arms 22 and which can be lifted together with the load frame. Further, one recognises two driving wheels 38, 40 in FIG. 2, which are arranged spaced apart along a transverse axis. One electric direct drive motor 42 or 44, respectively, is associated to each one of the driving wheels 38, 40 as a travelling motor. The motors 42, 44 are so-called external rotor motors, i.e. the externally lying rotor is splinedly coupled with the driving wheel 38 or 40, respectively. The direct drive motors 42, 44 are arranged recumbently. The driving wheels 38, 40 are rotatably mounted in fifth wheels 46, 48 (not shown in more detail; this is commonly known). A traction wheel 50 or 52, respectively, belongs to each fifth wheel, around which is wound a traction element 54 or 56, respectively, which is guided around a pinion of a steering motor 58 or 60, respectively. The steering motors 58, 60 are also driven electrically and have a relatively low construction height. It is smaller or at the most equal to the vertical extension of the driving wheels 38, 40. In this, the upper edge of the steering drive must lay above the travelling drive, in order to assure the clearance above ground of the steering motor 58, 60.

The blocks 62, 66, 68 contain control devices for the actuation of the steering motors 38, 40 and of the travelling motors 42, 44 as well as for the actuation of a lifting aggregate for lifting and lowering the load portion 10. Instead of a hydraulic lifting aggregate, an electric actuation device can be provided.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rider lift truck with a drive portion, in which is arranged a travelling drive featuring at least one electric travelling motor for at least one steered driving wheel, with a steering device for the driving wheel, a load portion featuring a mast, an electric control unit for the travelling drive and operational controls for the travelling drive and the steering device and with a standing platform, said standing platform being a part of said drive portion, said drive portion further including a case, wherein said standing platform and case provide an accommodation space for a traveling drive and said steering motor, a recumbently arranged travelling motor is provided below the flatly built standing platform as a wheel hub drive for the driving wheel, and a steering motor (58, 60) is arranged below the standing platform alongside to the travelling motor (42, 44), which is coupled to a fifth wheel (50, 52) for the driving wheel (38, 40) via a steering gear.

2. A rider lift truck according to claim 1, wherein the wheel hub drive is a direct drive.

3. A rider lift truck according to claim 1, wherein the upper side of the standing platform is designed to be planar throughout its extent.

4. A rider lift truck according to claim 1, wherein the standing platform (16) extends up to a case for the mast which guides a load frame, and a battery is arranged on the side of the case turned away from the standing platform.

5. A rider lift truck with a drive portion, in which is arranged a travelling drive featuring at least one electric travelling motor for at least one steered driving wheel, with a steering device for the driving wheel, a load portion featuring a mast, an electric control unit for the travelling drive and operational controls for the travelling drive and the steering device and with a standing platform, characterised in that a recumbently arranged travelling motor is provided below the flatly built standing platform as a wheel hub drive for the driving wheel, and a steering motor (58, 60) is arranged below the standing platform alongside to the travelling motor (42, 44), which is coupled to a fifth wheel (50, 52) for the driving wheel (38, 40) via a steering gear, characterised in that the wheel hub drive is a direct drive, wherein in the direct drive, the electric motor (42, 44) axially penetrates the hub of the driving wheel (38, 40), and the outside lying rotor of the electric motor (42, 44) is splinedly connected to the wheel hub.

6. A rider lift truck with a drive portion, in which is arranged a travelling drive featuring at least one electric travelling motor for at least one steered driving wheel, with a steering device for the driving wheel, a load portion featuring a mast, an electric control unit for the travelling drive and operational controls for the travelling drive and the steering device and with a standing platform, characterised in that a recumbently arranged travelling motor is provided below the flatly built standing platform as a wheel hub drive for the driving wheel, and a steering motor (58, 60) is arranged below the standing platform alongside to the travelling motor (42, 44), which is coupled to a fifth wheel (50, 52) for the driving wheel (38, 40) via a steering gear, wherein two driving wheels (38, 40) are provided, each at a time with a travelling motor (42, 44).

7. A rider lift truck according to claim 6, wherein one steering motor (58, 60) is associated to each one of the driving wheels (38, 40).

8. A rider lift truck according to claim 7, wherein parallel and approximately horizontally extending supporting arms (26, 28) are arranged on a upstanding assembly part (20) on the side facing the standing platform (16), from which at least one features operational controls (32) for the lift truck (10).

9. A rider lift truck according to claim 8, wherein an electric steering transmitter (30) is mounted on a supporting arm (26).

10. A rider lift truck according to claim 9, wherein at least one further operational control is mounted on the steering transmitter (30).

* * * * *